F. E. TRAVIS.
DRAFT EQUALIZER.
APPLICATION FILED SEPT. 30, 1908.
935,434.
Patented Sept. 28, 1909.
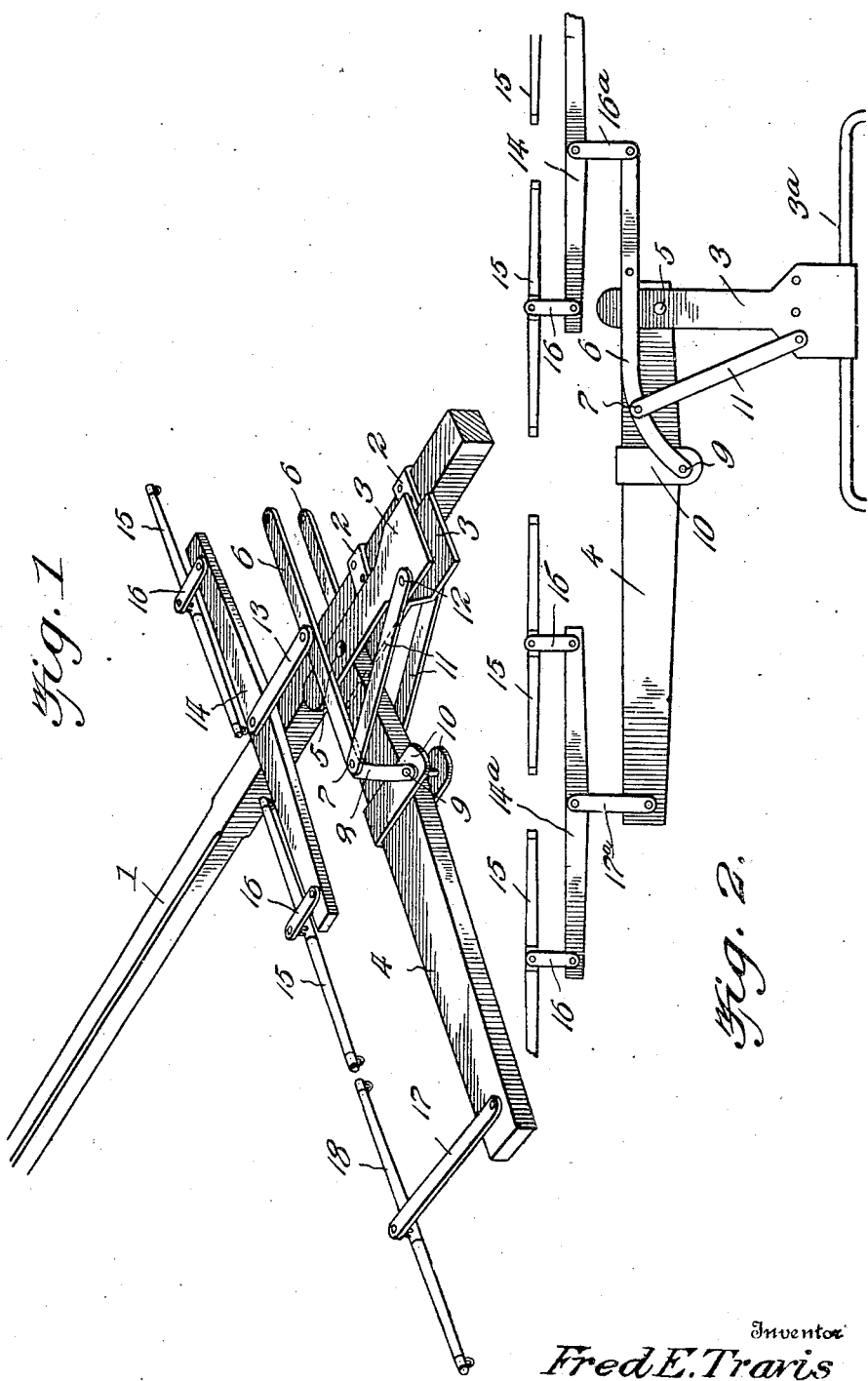
Witnesses
Frank B. Hoffman
Inventor
Fred E. Travis
By Victor J. Evans
Attorney

UNITED STATES PATENT OFFICE.

FRED E. TRAVIS, OF CARLINVILLE, ILLINOIS.

DRAFT-EQUALIZER.

935,434.  Specification of Letters Patent.  Patented Sept. 28, 1909.

Application filed September 30, 1908. Serial No. 455,580.

*To all whom it may concern:*

Be it known that I, FRED E. TRAVIS, a citizen of the United States of America, residing at Carlinville, in the county of Macoupin and State of Illinois, have invented new and useful Improvements in Draft-Equalizers, of which the following is a specification.

This invention relates to draft equalizers, and one of the principal objects of the invention is to provide a three-horse equalizer which can be readily converted into a four-horse draft evener.

Another object of the invention is to provide a three-horse draft equalizer adapted to be connected to the tongue of an agricultural implement and which will avoid the side draft, and to provide means whereby said equalizer may be quickly converted into a four-horse evener for connection to a plow or similar implement not provided with a tongue.

These and other objects may be attained by means of the construction illustrated in the accompanying drawing, in which,—

Figure 1 is a perspective view of a three-horse evener made in accordance with my invention and connected to the tongue. Fig. 2 is a plan view of my equalizer converted into a four-horse evener.

Referring to Fig. 1 of the drawing, the numeral 1 designates a draft tongue, and secured to one side of the tongue by means of suitable clips 2 are the spaced clevis plates 3. Pivoted between the front ends of the clevis plates 3 is a draft bar 4, said bar being pivoted upon the pin 5. Levers 6, each having a curved arm 8, are pivoted to a brace 11 by means of a rivet 7. The outer ends of each of the curved arms 8 are pivoted to a pin 9 passing through a clevis 10 secured to the draft bar 4. The diagonal brace bars 11 are pivoted at their rear ends at 12 to the clevis plates 3. The brace bars 11 are pivoted at their front ends near the curved portions of the levers 6. Pivotally connected to one of the levers 6 is a link 13, to the front end of which a doubletree 14 is pivoted, said doubletree carrying swingletrees 15, one at each end connected to said doubletree by means of pivoted links 16. On the opposite end of the draft bar 4 a pivoted link 17 supports a swingletree 18.

When it is desired to convert the three-horse evener into a four-horse equalizer, the doubletree 14 and the swingletree 18 are detached, and the clips 2 are detached from the clevis plates 3.

Referring now to Fig. 2, the clevis plates 3 are connected to a draft bar $3^a$ at the front of a plow or other implement. Connected to the outer ends of the levers 6 is a link $16^a$ to which the doubletree 14 is pivoted, said doubletree carrying the two swingletrees 15 connected thereto by means of a link 16. At the outer end of the draft bar 4 a link $17^a$ is pivotally connected to a doubletree $14^a$ carrying swingletrees 15 connected to the doubletree by means of links 16.

From the foregoing it will be obvious that the three-horse evener shown in Fig. 1 may be readily converted into a four-horse equalizer such as is shown in Fig. 2. This adjustment can be quickly made, and the device will operate efficiently under both conditions of use.

I claim:—

The herein described convertible draft equalizer and three-horse evener comprising a pole, clevis plates connected to the pole and extending upon one side thereof in line with said pole, a draft bar pivoted between said clevis plates, spaced levers each provided with a curved end, said levers being pivoted at their curved ends to a clevis on the draft bar, braces pivoted to said clevis plates at one end, the opposite ends of said braces being pivoted to said levers near their curved portions, a doubletree, a link connected to one of said levers and to said doubletree, and a swingletree connected by a link to said draft bar.

In testimony whereof I affix my signature in presence of two witnesses.

FRED E. TRAVIS.

Witnesses:
 ROBERT E. BORING,
 HENRY SCHOENHERR.